(12) United States Patent
Wu

(10) Patent No.: US 10,368,238 B2
(45) Date of Patent: Jul. 30, 2019

(54) DEVICE AND METHOD OF HANDLING DATA TRANSMISSION/RECEPTION FOR DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 240 days.

(21) Appl. No.: 15/362,747

(22) Filed: Nov. 28, 2016

(65) Prior Publication Data

US 2017/0156060 A1    Jun. 1, 2017

Related U.S. Application Data

(60) Provisional application No. 62/261,318, filed on Dec. 1, 2015.

(51) Int. Cl.
*H04L 29/06*   (2006.01)
*G06F 21/00*   (2013.01)
(Continued)

(52) U.S. Cl.
CPC ........... *H04W 12/04* (2013.01); *H04L 9/0861* (2013.01); *H04L 9/0891* (2013.01);
(Continued)

(58) Field of Classification Search
CPC .... H04W 12/04; H04W 88/02; H04L 9/0861; H04L 63/062; H04L 9/0891; H04L 63/061; H04L 2209/80; H04L 2463/061
See application file for complete search history.

(56) References Cited

U.S. PATENT DOCUMENTS 9,913,179 B2 *   3/2018   Kompalli Chakravartula ............. H04W 36/0083
2017/0134996 A1 *   5/2017   Wang ................... H04W 12/04
(Continued)

FOREIGN PATENT DOCUMENTS

CN    101772100 A    7/2010
CN    102238541 A    11/2011
(Continued)

OTHER PUBLICATIONS

3GPP TS 36.300 V13.1.0 (Sep. 2015) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
(Continued)

*Primary Examiner* — Lisa C Lewis
(74) *Attorney, Agent, or Firm* — Winston Hsu

(57) ABSTRACT

A communication device for handling data transmission/reception for dual connectivity comprises a storage unit for storing instructions of connecting to a first base station (BS) and a second BS; receiving a message from the first BS, wherein the message configures a handover to a third BS and a connection change to a fourth BS; updating a first parent key to a first updated parent key and updating a second parent key to a second updated parent key based on the first updated parent key, in response to the message; updating a first security key to a first updated security key based on the first updated parent key and updating a second security key to a second updated security key based on the second updated parent key, in response to the message.

4 Claims, 3 Drawing Sheets

(51) Int. Cl.
 *H04W 12/04* (2009.01)
 *H04L 9/08* (2006.01)
 *H04W 88/02* (2009.01)
(52) U.S. Cl.
 CPC .......... *H04L 63/061* (2013.01); *H04L 63/062* (2013.01); *H04L 2209/80* (2013.01); *H04L 2463/061* (2013.01); *H04W 88/02* (2013.01)

(56) References Cited

U.S. PATENT DOCUMENTS

2017/0222876 A1* 8/2017 Van Der Velde ........................... H04W 36/0055
2018/0279193 A1* 9/2018 Park ...................... H04W 36/08

FOREIGN PATENT DOCUMENTS

| CN | 103959829 | A | 7/2014 |
|---|---|---|---|
| CN | 104219722 | A | 12/2014 |
| CN | 104936174 | A | 9/2015 |
| EP | 2863681 | A1 | 4/2015 |
| JP | 2015-177548 | A | 10/2015 |
| WO | 2015/113207 | A1 | 8/2015 |
| WO | 2015/135292 | A1 | 9/2015 |
| WO | 2015/136888 | A1 | 9/2015 |

OTHER PUBLICATIONS

3GPP TS 36.331 V12.7.0 (Sep. 2015) Technical Specification 3rd Generation Partnership Project; Technical Specification Group Radio Access Network; Evolved Universal Terrestrial Radio Access (E-UTRA); Radio Resource Control (RRC); Protocol specification (Release 12).

3GPP TS 36.323 V12.4.0 (Jun. 2015) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).

Office Action dated Feb. 20, 2018 for the Japanese Application No. 2016-231962, filing date Nov. 30, 2016, pp. 1-4.

Search Report dated Mar. 30, 2017 for EP application No. 16201187.8, pp. 1~9.

3GPP TS 36.331 V12.4.1 (Dec. 2014), "3rd Generation Partnership Project; Technical Specification Group Radio Access Network; Evolved Universal Terrestrial Radio Access (E-UTRA); Radio Resource Control (RRC); Protocol specification (Release 12)", XP050927575, pp. 1-410.

3GPP TS 33.401 V13.0.0 (Sep. 2015), "3rd Generation Partnership Project; Technical Specification Group Services and System Aspects; 3GPP System Architecture Evolution (SAE); Security architecture (Release 13)", XP050996290, pp. 1-131.

* cited by examiner

DEVICE AND METHOD OF HANDLING DATA TRANSMISSION/RECEPTION FOR DUAL CONNECTIVITY

CROSS REFERENCE TO RELATED APPLICATIONS

This application claims the benefit of U.S. Provisional Application No. 62/261,318 filed on Dec. 1, 2015, which is incorporated herein by reference.

BACKGROUND OF THE INVENTION

1. Field of the Invention

The present invention relates to a device and a method used in a wireless communication system, and more particularly, to a device and a method of handling a data transmission/reception for dual connectivity.

2. Description of the Prior Art

A long-term evolution (LTE) system provides high data rate, low latency, packet optimization, and improved system capacity and coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

A UE may be configured dual connectivity, i.e., is connected to a master eNB (MeNB) and a secondary eNB (SeNB). The MeNB (i.e., source MeNB) may initiate an inter-MeNB handover, and a target MeNB may decide to keep the SeNB. When the UE receives a handover command and the handover command involving a SCG change, the UE updates a S-$K_{eNB}$ key and a $K_{eNB}$ key. However, it is not known which one of the S-$K_{eNB}$ key and the $K_{eNB}$ key should be updated first by the UE.

According to the prior art, when the UE receives a handover command and the handover command involving a SCG change, the UE may perform a random access procedure to the SeNB first and then may perform a random access procedure to the MeNB. Completeness of handover is delayed and possibility of a handover failure is increased, since the UE transmits an RRCConnectionReconfiguration-Complete to the MeNB after successfully completing the random access procedure to the SeNB.

Thus, how to handle a data transmission/reception for dual connectivity is an important problem to be solved.

SUMMARY OF THE INVENTION

The present invention therefore provides a communication device and method for handling data transmission/reception for dual connectivity to solve the abovementioned problem.

A communication device for handling data transmission/reception for dual connectivity comprises a storage unit for storing instructions and a processing circuit coupled to the storage unit. The processing circuit is configured to execute the instructions stored in the storage unit. The instructions comprise connecting to a first base station (BS) and a second BS; communicating first data with the first BS, wherein the first data is encrypted according to a first security key which is generated according to a first parent key; communicating second data with the second BS, wherein the second data is encrypted according to a second security key which is generated according to a second parent key; receiving a message from the first BS, wherein the message configures a handover to a third BS and a connection change to a fourth BS; updating the first parent key to a first updated parent key and updating the second parent key to a second updated parent key based on the first updated parent key, in response to the message; updating the first security key to a first updated security key based on the first updated parent key and updating the second security key to a second updated security key based on the second updated parent key, in response to the message; communicating third data with the third BS, wherein the third data is encrypted according to the first updated security key; and communicating fourth data with the fourth BS, wherein the fourth data is encrypted according to the second updated security key.

A method of handling data transmission/reception for dual connectivity for a communication device comprises connecting to a first base station (BS) and a second BS; communicating first data with the first BS, wherein the first data is encrypted according to a first security key which is generated according to a first parent key; communicating second data with the second BS, wherein the second data is encrypted according to a second security key which is generated according to a second parent key; receiving a message from the first BS, wherein the message configures a handover to a third BS and a connection change to a fourth BS; updating the first parent key to a first updated parent key and updating the second parent key to a second updated parent key based on the first updated parent key, in response to the message; updating the first security key to a first updated security key based on the first updated parent key and updating the second security key to a second updated security key based on the second updated parent key, in response to the message; communicating third data with the third BS, wherein the third data is encrypted according to the first updated security key; and communicating fourth data with the fourth BS, wherein the fourth data is encrypted according to the second updated security key.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
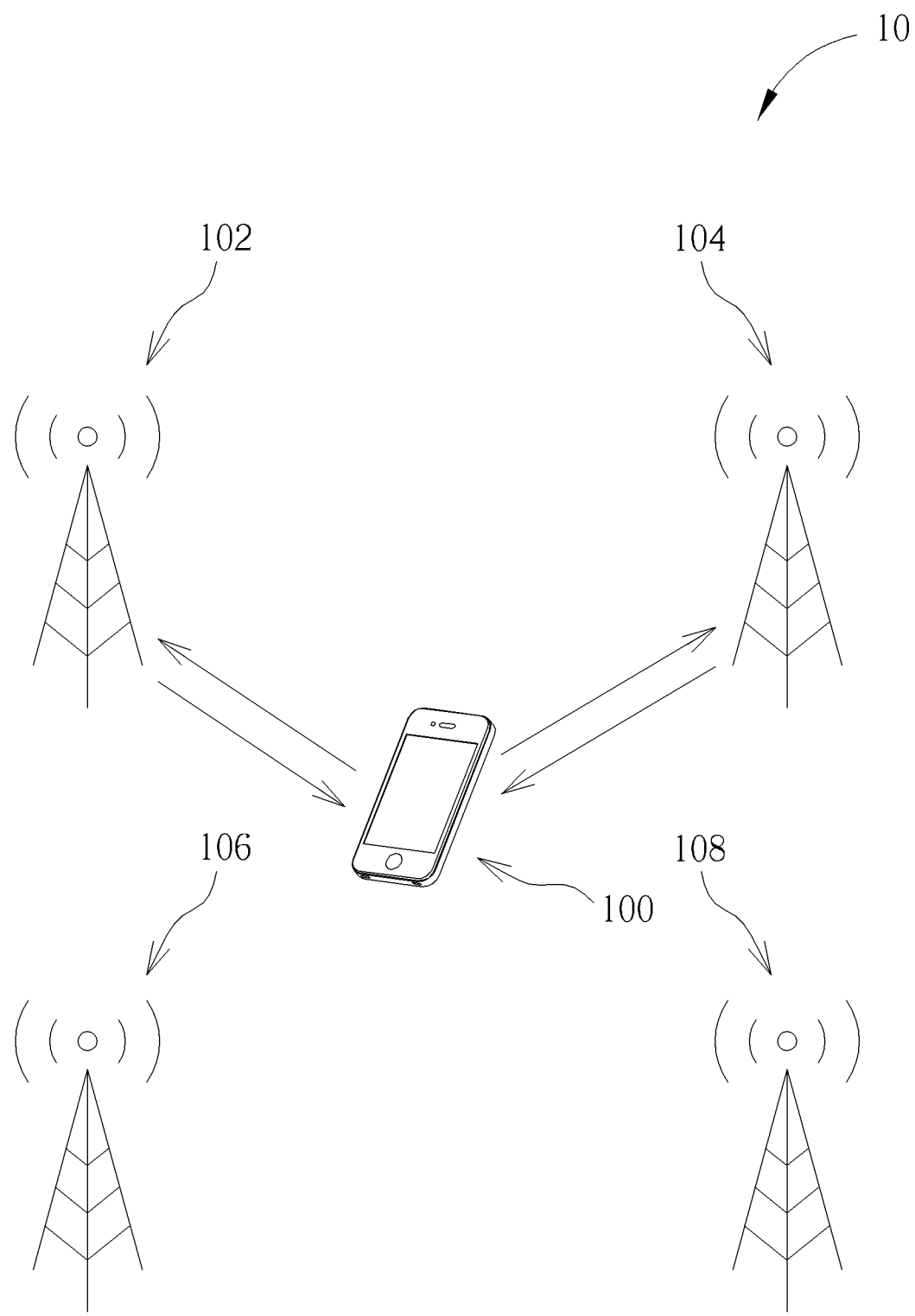
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, base stations (BSs) 102, 104, 106 and 108. In FIG. 1, the communication device 100, the BSs 102-108 and are simply utilized for illustrating the structure of the wireless communication system 10. Practically, the BS 102, the BS 104, the BS 106 and/or the BS 108 may be evolved NB (s) (eNB(s)) and/or relay (s) station in an evolved Universal Terrestrial Radio Access Network (E-UTRAN), or may be 5G BS (s) which employs orthogonal frequency-division multiplexing (OFDM) and/or non-OFDM and a transmission time interval (TTI) shorter than 1 ms (e.g. 100 or 200 microseconds). In FIG. 1, coverage areas of the BS 102, the BS 104, the BS 106 and/or the BS 108 may be overlapped or non-overlapped.

As shown in FIG. 1, the communication device 100 may be configured to communicate with the BS 102 and the BS 104 at the same time according to dual connectivity. That is, the communication device 100 may perform transmission/reception via both the BSs 102 and 104. For example, the communication device 100 may transmit and/or receive packets (e.g., protocol data units (PDUs)) to and/or from at least one cell of the BS 102, while the communication device 100 may transmit and/or receive packets (e.g., PDUs) to and/or from at least one cell of the BS 104 according to the dual connectivity. In addition, one of the BSs 102 and 104 may be a master BS (MBS) and the other BS may be a secondary BS (SBS). In one example, the MBS may be a master eNB (MeNB) and the SBS may be a secondary eNB (SeNB) according to the dual connectivity defined in the 3rd Generation Partnership Project (3GPP). One of the cell(s) of the MBS may be a primary cell (PCell) for the communication device 100. One of the cell(s) of the SBS may be a primary SCell (PSCell) for the communication device 100. Zero, one or more other cell(s) of the MBS and/or the SBS may be SCell(s) for the communication device 100.

Technical terms related to the examples in the present invention are explained as follows to simplify description of successive examples. The dual connectivity may be an operation mode of a communication device in RRC_CONNECTED, which is configured with a master cell group (MCG) and a secondary cell group (SCG) to the UE. The MeNB may be an eNB which terminates at least S1-MME. The SeNB may be an eNB which provides additional radio resources but is not a MeNB. The MCG may be one or more serving cells associated with a MeNB, which may include a PCell and optionally one or more SCells. The SCG may be one or more serving cells associated with a SeNB, which may include a PSCell and optionally one or more SCells. A MCG bearer may be a radio bearer whose radio protocols are only located in a MeNB to use MeNB resources only. A SCG bearer may be a radio bearer whose radio protocols are only located in a SeNB to use SeNB resources. A split bearer may be a bearer whose radio protocols are located in both the MeNB and the SeNB to use both MeNB and SeNB resources.

The communication device 100 may be a user equipment (UE), a mobile phone, a laptop, a tablet computer, an electronic book, a portable computer system, a vehicle, or an airplane. For uplink, the communication device 100 is the transmitter and the BS 102 and/or the BS 104 is the receiver, and for downlink, the BS 102 and/or the BS 104 is the transmitter and the communication device 100 is the receiver.

Figure 2:
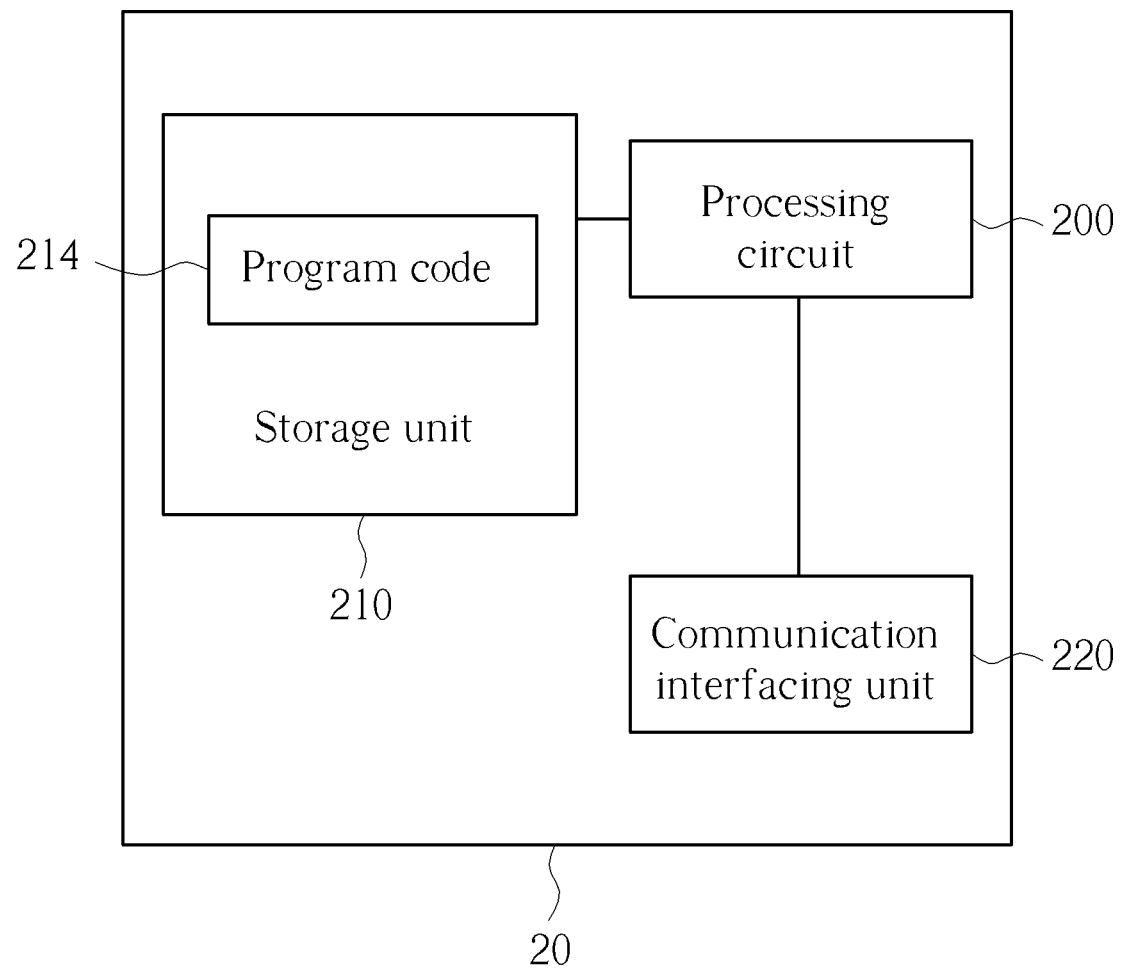
FIG. 2 is a schematic diagram of a communication device according to an example of the present invention.

FIG. 2 is a schematic diagram of a communication device 20 according to an example of the present invention. The communication device 20 may be the communication device 100, the BS 102, the BS 104, the BS 106 and/or the BS 108 shown in FIG. 1, but is not limited herein. The communication device 20 includes a processing circuit 200 such as a microprocessor or Application Specific Integrated Circuit, a storage unit 210 and a communication interfacing unit 220. The storage unit 210 may be any data storage device that stores a program code 214, accessed and executed by the processing circuit 200. Examples of the storage unit 210 include but are not limited to read-only memory, flash memory, random-access memory, hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing circuit 200.

In the following embodiments, a UE is used to represent a communication device in FIG. 1, to simplify the illustration of the embodiments.

Figure 3:
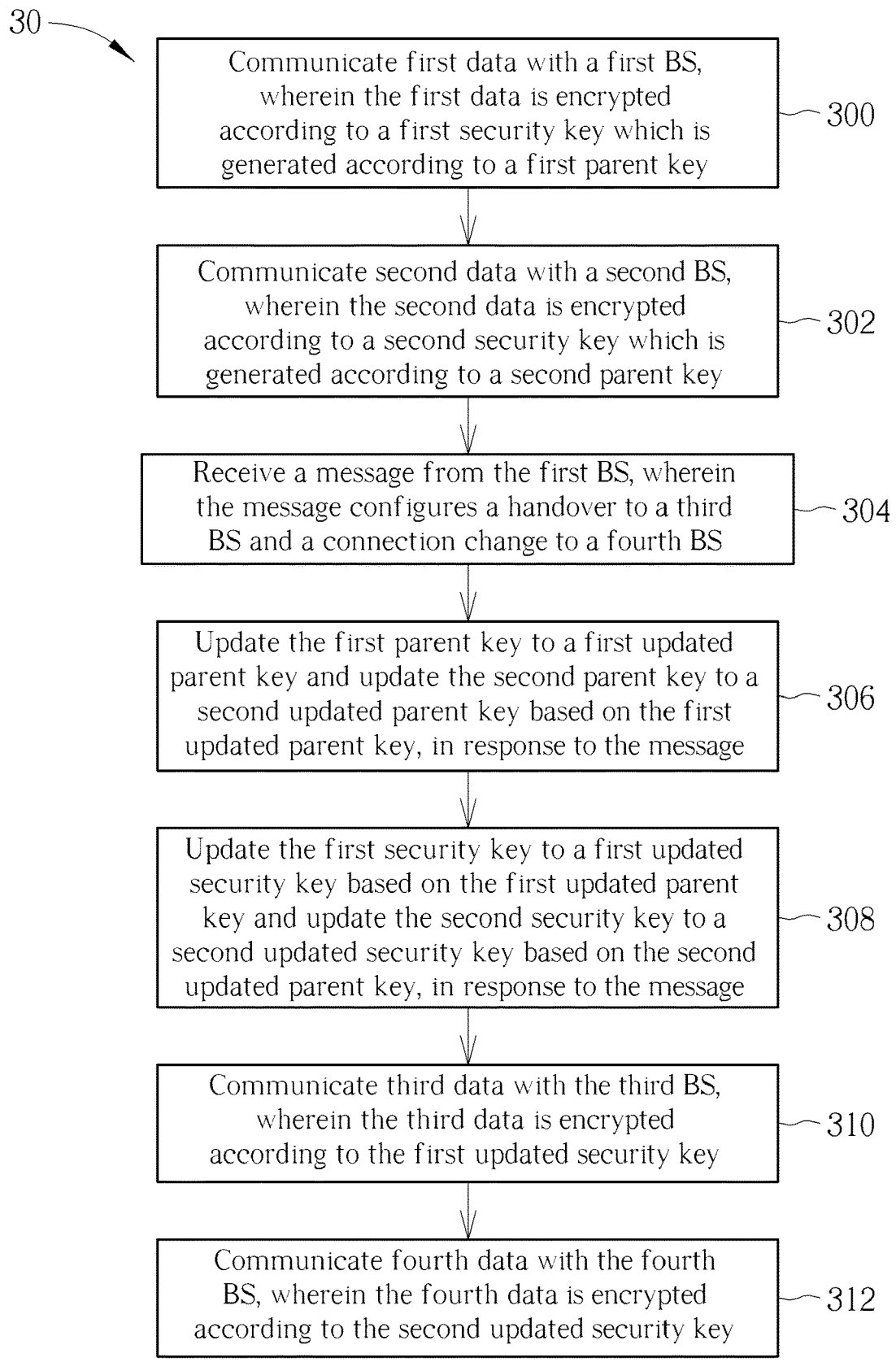
FIG. 3 is a flowchart of a process according to an example of the present invention.

FIG. 3 is a flowchart of a process 30 according to an example of the present invention. The process 30 may be utilized in a UE (e.g., the communication device 100), to handle data transmission/reception for dual connectivity with multiple BSs (e.g., the BSs 102-108). The process 30 may be compiled into the program code 214 and includes the following steps:

Step 300: Communicate first data with a first BS, wherein the first data is encrypted according to a first security key which is generated according to a first parent key.

Step 302: Communicate second data with a second BS, wherein the second data is encrypted according to a second security key which is generated according to a second parent key.

Step 304: Receive a message from the first BS, wherein the message configures a handover to a third BS and a connection change to a fourth BS.

Step 306: Update the first parent key to a first updated parent key and update the second parent key to a second updated parent key based on the first updated parent key, in response to the message.

Step 308: Update the first security key to a first updated security key based on the first updated parent key and update the second security key to a second updated security key based on the second updated parent key, in response to the message.

Step 310: Communicate third data with the third BS, wherein the third data is encrypted according to the first updated security key.

Step 312: Communicate fourth data with the fourth BS, wherein the fourth data is encrypted according to the second updated security key.

According to the process 30, the UE first connects to a first BS (e.g., the BS 102) and a second BS (e.g., the BS 104), i.e., in dual connectivity. Then, the UE communicates (e.g., transmits or receives) first data with the first BS, wherein the first data is encrypted according to a first security key which is generated according to a first parent key. The UE communicates second data with the second BS, wherein the second data is encrypted according to a second security key which is generated according to a second parent key. After a while, the UE may receive a message from the first BS, wherein the message configures a handover to a third BS (e.g., the BS 102 or the BS 106) and a connection change to a fourth BS (e.g., the BS 104 or the BS 108). The UE updates the first parent key to a first updated parent key and update the second parent key to a second updated parent key based on the first updated parent key, in response to the message. In addition, the UE updates the first security key to a first updated security key based on the first updated parent key and update the second security key to a second updated security key based on the second updated parent key, in response to the message. Thus, the UE can communicate third data with the third BS, wherein the third data is encrypted according to the first updated security key, and the UE can communicate fourth data with the fourth BS, wherein the fourth data is encrypted according to the second updated security key. That is, a procedure for handling the encryption/description of the data is provided, such that the UE is able to communicate the data with multiple BSs (e.g., according to dual connectivity) properly after receiving the handover command. Thus, the problem in the art is solved.

When the first BS and the third BS are the same BS (i.e., MBS), the handover is an intra-BS handover. When the first BS and the third BS are different BSs, the handover is an inter-BS handover. When the second BS and the fourth BS are the same BS (i.e., SBS), the connection change is an intra-BS SCG change. When the second BS and the fourth BS are different BSs, the connection change is an inter-BS SCG change. The inter-BS handover may be seen as a MBS change.

An example is illustrated according to the process 30 as follows. A UE is configured to connect to a first eNB and a second eNB, wherein the first eNB is a MeNB of the UE and the second eNB is a SeNB of the UE. The UE transmits/receives one or more first packet data convergence protocol (PDCP) service data units (SDUs) (i.e. data) to/from the first eNB, wherein each of the one or more first PDCP SDUs is encrypted by using a first encryption key (first $K_{UPenc}$ key) derived from a $K_{eNB}$ key. The UE transmits/receives one or more second PDCP SDUs to/from the second eNB, wherein each of the one or more second PDCP SDUs is encrypted by using a second encryption key (second $K_{UPenc}$ key) derived from a S-$K_{eNB}$ key. After a while, the first eNB determines to perform a handover. The first eNB transmits an RRCConnectionReconfiguration message including both mobilityControlInfo (i.e., for handover) and mobilityControlInfoSCG (i.e., for SCG change) to the UE. When the UE receives the RRCConnectionReconfiguration message, the UE first updates the $K_{eNB}$ key according to the RRCConnectionReconfiguration message, and then the UE second updates the S-$K_{eNB}$ key according to the updated $K_{eNB}$ key. The UE updates the first $K_{UPenc}$ key based on the updated $K_{eNB}$ key and uses the first updated $K_{UPenc}$ key for encryption/decryption of data transmitted/received to/from a third eNB, after handing over to the third eNB. The UE updates the second $K_{UPenc}$ key based on the updated S-$K_{eNB}$ key, and uses the second updated $K_{UPenc}$ key for encryption/decryption of data transmitted/received to/from a fourth eNB, after performing the SCG change to the fourth eNB.

In other words, when the UE receives the RRCConnectionReconfiguration message indicating the SCG change (i.e., including the mobilityControlInfoSCG), the UE determines whether the RRCConnectionReconfiguration message indicates the handover (i.e., including the mobilityControlInfo). If the RRCConnectionReconfiguration message indicating the handover, the UE updates the $K_{eNB}$ key and updates the S-$K_{eNB}$ key based on the updated $K_{eNB}$ key. If the RRCConnectionReconfiguration message does not indicate the handover (i.e., not including the mobilityControlInfo), the UE updates the S-$K_{eNB}$ key based on the $K_{eNB}$ key.

It should be noted that the third eNB may be the first eNB (i.e., intra-MeNB handover) or an eNB different from the first eNB (i.e., inter-MeNB handover). The fourth eNB may be the second eNB or an eNB different from the second eNB.

Realization of the process 30 is not limited to the above description. The following examples may be applied to the process 30.

In one example, the instruction of connecting to the first BS and the second BS may include receiving a first configuration configuring a first radio bearer as a MCG bearer for communicating with the first BS, from the first BS, and may include receiving a second configuration configuring a second radio bearer as a SCG bearer for communicating with the second BS, from one of the first BS and the second BS. For example, the first eNB may transmit the first configuration to the UE in a first radio resource control (RRC) message (e.g., RRCConnectionReconfiguration message). The first eNB may transmit the second configuration to the UE in a second RRC message (e.g., RRCConnectionReconfiguration message). The second RRC message may include a SCG configuration, and the SCG configuration may include cell identity information (e.g., cell global identifier, physical cell identity and/or DL carrier frequency) for identifying a cell of the second eNB.

In one example, the UE may perform a first random access procedure to the third BS, in response to the message, and may perform a second random access procedure to the fourth BS after successfully completing the first random access procedure, in response to the message. That is, a priority of the first random access procedure is higher than a priority of the second random access procedure, and thus the first random access procedure should be performed first.

In one example, the UE may perform a first random access procedure to the third BS, in response to the message, and may perform a second random access procedure to the fourth BS while performing the first random access procedure. That is, the UE performs the first random access procedure and the second random access procedure in parallel in a time period. In other words, the UE performs the second random access procedure without waiting for completing the first random access procedure successfully. Thus, the UE can finish both the handover and the SCG change as soon as possible, and the UE can communicate the data with the fourth BS earlier.

It should be noted that transmission timing of a random access preamble of the first random access procedure and transmission timing of a random access preamble of the second random access procedure may be the same or different.

If the UE in dual connectivity with the MBS and the SBS detects that a first radio link failure (RLF) occurs on a radio link with the SBS, the UE stops communicating with the SBS and transmits a message indicating the first RLF to the MBS.

If the UE in dual connectivity with the MBS and the SBS detects that a second RLF occurs on a radio link with the MBS, the UE stops communicating with the MBS and the SBS and performs a recovery procedure (e.g., RRC connection reestablishment procedure). In the recovery procedure, the UE recovers the radio link with the MBS but does not recover the radio link with the SBS. In response to the recovery procedure, the UE updates the first parent key to a third updated parent key and updates the first security key based on the third updated parent key. However, the UE does not update the second parent key, and does not use the second parent key and the second security key anymore.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

To sum up, the present invention provides a device and a method for handling encryption/description of data is provided, such that the UE is able to communicate the data with multiple BSs (e.g., according to dual connectivity) properly after receiving the handover command. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling data transmission/reception for dual connectivity, comprising:
a storage unit, for storing instructions of:
connecting to a first base station (BS) and a second BS;
communicating first data with the first BS, wherein the first data is encrypted according to a first security key which is generated according to a first parent key;
communicating second data with the second BS, wherein the second data is encrypted according to a second security key which is generated according to a second parent key;
receiving a message from the first BS, wherein the message configures a handover to a third BS and a connection change to a fourth BS;
updating the first parent key to a first updated parent key and updating the second parent key to a second updated parent key based on the first updated parent key, in response to the message;
updating the first security key to a first updated security key based on the first updated parent key and updating the second security key to a second updated security key based on the second updated parent key, in response to the message;
performing a first random access procedure to the third BS, in response to the message;
performing a second random access procedure to the fourth BS, after successfully completing the first random access procedure or while performing the first random access procedure, in response to the message;
communicating third data with the third BS, wherein the third data is encrypted according to the first updated security key; and
communicating fourth data with the fourth BS, wherein the fourth data is encrypted according to the second updated security key; and
a processing circuit, coupled to the storage unit, configured to execute the instructions stored in the storage unit.

2. The communication device of claim 1, wherein the instruction of connecting to the first BS and the second BS comprises:
receiving a first configuration configuring a first radio bearer as a master cell group (MCG) bearer for communicating with the first BS, from the first BS; and
receiving a second configuration configuring a second radio bearer as a second cell group (SCG) bearer for communicating with the second BS, from one of the first BS and the second BS.

3. A method of handling data transmission/reception for dual connectivity for a communication device, the method comprising:
connecting to a first base station (BS) and a second BS;
communicating first data with the first BS, wherein the first data is encrypted according to a first security key which is generated according to a first parent key;
communicating second data with the second BS, wherein the second data is encrypted according to a second security key which is generated according to a second parent key;
receiving a message from the first BS, wherein the message configures a handover to a third BS and a connection change to a fourth BS;
updating the first parent key to a first updated parent key and updating the second parent key to a second updated parent key based on the first updated parent key, in response to the message;
updating the first security key to a first updated security key based on the first updated parent key and updating the second security key to a second updated security key based on the second updated parent key, in response to the message;
performing a first random access procedure to the third BS, in response to the message;
performing a second random access procedure to the fourth BS, after successfully completing the first random access procedure or while performing the first random access procedure, in response to the message;
communicating third data with the third BS, wherein the third data is encrypted according to the first updated security key; and
communicating fourth data with the fourth BS, wherein the fourth data is encrypted according to the second updated security key.

4. The method of claim 3, further comprising:
receiving a first configuration configuring a first radio bearer as a master cell group (MCG) bearer for communicating with the first BS, from the first BS; and
receiving a second configuration configuring a second radio bearer as a second cell group (SCG) bearer for communicating with the second BS, from one of the first BS and the second BS.

* * * * *